United States Patent [19]

Bolger

[11] 4,134,072
[45] Jan. 9, 1979

[54] DIRECT DIGITAL FREQUENCY SYNTHESIZER

[75] Inventor: Thomas V. Bolger, Merchantville, N.J.

[73] Assignee: RCA Corporation, New York, N.Y.

[21] Appl. No.: 830,857

[22] Filed: Sep. 6, 1977

[51] Int. Cl.$^2$ ............................................. H03B 19/00
[52] U.S. Cl. ..................................... 328/14; 324/83 D; 340/347 AD; 364/721
[58] Field of Search .................. 328/14; 340/347 AD; 235/175; 324/83 D, 79 D; 332/19

[56] References Cited

U.S. PATENT DOCUMENTS

| | | | |
|---|---|---|---|
| 3,689,914 | 9/1972 | Butler | 328/14 X |
| 3,735,269 | 5/1973 | Jackson | 328/14 |
| 3,973,209 | 8/1976 | Nossen et al. | 235/175 X |
| 3,984,771 | 10/1976 | Nossen et al. | 324/83 D |
| 4,021,757 | 5/1977 | Nossen | 332/19 |
| 4,053,839 | 10/1977 | Knoedl | 328/14 X |

OTHER PUBLICATIONS

*Computer Design* Jul. 1975, pp. 100–102, "Digital Synthesizers Produce Wide Frequency Range from Single Source," by John D. Fogarty.

*IEEE Transactions on Audio & Electroacoustics*, Mar. 1971, pp. 49–57, "A Digital Frequency Synthesizer," by Joseph Tierney et al.

*Primary Examiner*—John S. Heyman
*Attorney, Agent, or Firm*—H. Christoffersen; Samuel Cohen; Carl V. Olson

[57] ABSTRACT

A desired output frequency can be generated by applying a corresponding digital phase step number to an accumulator to generate multiples of the number for application to a sine wave look-up table from which digital samples of the sine wave amplitude are obtained. The digital samples can be applied through a digital-to-analog converter to produce the desired output frequency in analog form. A time division multiplex system is disclosed in which a plurality of digital phase step numbers are used to generate an equal plurality of output frequencies. Each digital phase shift number may be altered in accordance with modulating signals so that each output frequency is frequency-shift keyed, and/or phase shift keyed, and/or on-off keyed.

8 Claims, 1 Drawing Figure

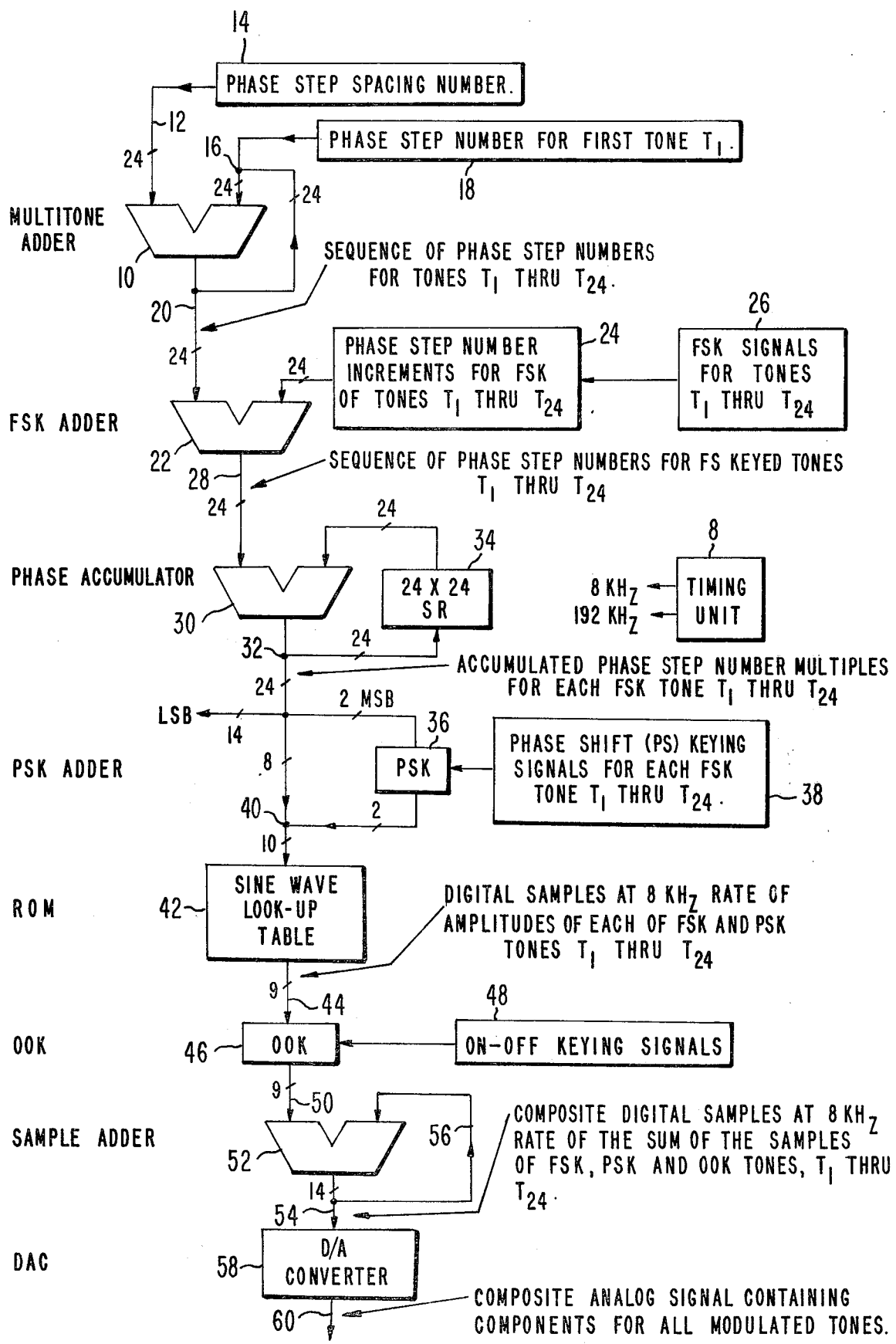

DIRECT DIGITAL FREQUENCY SYNTHESIZER

This invention relates to frequency synthesizers for the generation of output signals of desired frequencies by the direct digital method.

Digital synthesizers, which create waveforms by stepwise outputting samples of the waveform stored in a read-only memory, are described in an article by John D. Fogarty entitled "Digital Synthesizers Produce Wide Frequency Range from Single Source," appearing at pages 100–102 of the July, 1975, issue of *Computer Design* magazine. A desired output frequency is generated by applying a corresponding digital phase step number to an accumulator to generate multiples of the number for application to a sine wave look-up table from which digital samples of the sine wave amplitude are obtained and applied through a digital-to-analog converter and a smoothing filter. The concept of altering the digital phase shift number in accordance with a modulating signal so that the output frequency is frequency modulated is disclosed in an article of Joseph Tierney et al. entitled "A Digital Frequency Synthesizer" appearing on pages 48–57 of the March, 1971, issue of *IEEE Transactions on Audio and Electroacoustics*, and in U.S. Pat. No. 3,689,914 issued on Sept. 5, 1972, to J. G. Butler on a "Waveform Generator," and assigned to the assignee of the present application.

According to an example of the invention, a time division multiplex system is provided in which a plurality of digital phase step numbers are used to generate an equal plurality of output frequencies, each represented by digital samples of a corresponding analog signal. According to another example of the invention, means are provided to alter a digital phase shift number in accordance with a plurality of modulating signals so that the output frequency is frequency-shift keyed, and/or phase shift keyed.

By way of example, the invention is useful as test equipment to provide signals for application to demodulators, and as transmitter equipment to generate signals for propagation to distant points.

In the drawing:

The sole FIGURE of the drawing is a schematic diagram of a system constructed according to the teachings of the invention to generate a composite signal containing a plurality of frequency components each of which may be frequency-shift keyed, and/or phase-shift keyed, and/or on-off keyed.

For reasons of brevity, the drawing, specification and claims contain numerous references to binary digits and numbers, when what is meant is signals or electrical manifestations representing the digits or numbers. For example, a reference to "a source of a phase step number" is intended to mean "a source of *an electrical signal representing* a phase step number."

Referring now in greater detail to the drawing, a multi-tone summer or adder 10 has one input 12 receptive to twenty-four binary digits from a source 14 of a phase step spacing number, and has another input 16 receptive to twenty-four binary digits from a source 18 of phase step numbers for a first tone $T_1$. Here and elsewhere in the figure the n signals produced by a unit are carried by the n conductors, repectively, of a cable. The number (such as 24) next to a cable indicates the number of conductors in the cable. The output of adder 10 is a sequence of phase step numbers for a plurality of derived output tones, which are $T_1$ through $T_{24}$ in the example to be described.

It is assumed that the frequency synthesizer should be capable of generating any desired output frequency in the range of from 1 to 4000 Hz, where the frequencies are all integers to provide a 1 Hz granularity, with a sampling frequency of 8000 Hz, and with an accuracy of better than one part in 10,000. From these requirements, and the fact that the number of binary digits representing 360° is 24, it is determined that the phase step number for generating a 1 Hz output frequency should be 2,097, which corresponds with a phase step of 0.45°. Accumulating the phase step number 2,097 (in the form of 12 binary digits representing 0.45°) in integer multiples produces the series 2,097; 4,194; 8,388; 16,776; 33,552 . . . to 16,776,000 (in the form of 24 binary digits representing 360°) after 8000 additions. This final value is close enough to $2^{24} = 16,777,216$ to provide the desired accuracy.

If the first tone $T_1$ of the 24 tones produced by the frequency synthesizer is to be 1 Hz, then the source 18, which is controlled by timing unit 8, supplies the phase step number 2,097 to the adder 10 repeatedly at a clock rate of 8000 Hz provided by timing unit 8. On the other hand, if the first tone $T_1$ is to be 500 Hz, then the source 18 repeatedly supplies the 500th multiple of 2,097 or 1,048,500 to the adder 10 at the clock rate of 8000 Hz. If the other tones $T_2$ through $T_{24}$ are to be frequencies in Hertz of 600, 700, 800, 900, . . . 2,900, with a spacing of 100 Hz, then the source 14 of a phase step spacing number repeatedly supplies the number 100 × 2,097 at a clock rate of 24 × 8000 Hz = 192 KHz provided by timing unit 8. The adder 10 produces the sequence of 24 phase step numbers 500 × 2,097, 600 × 2,097, 700 × 2,097, . . . to 2,900 × 2,097 during one cycle of 8000 Hz, resets to 500 × 2,097 and then repeats the 24 outputs during the next cycle of 8000 Hz. The output at 20 of adder 10 is thus a time division multiplexed sequence of phase step numbers for 24 tones $T_1$ through $T_{24}$. The timing unit 8 also controls the timing in an obvious manner of all the other units to be described in the drawing.

The phase step numbers for tones $T_1$ through $T_{24}$ are supplied to one input 20 of an FSK summer or adder 22 which has another input from a source 24 of phase step number increments for frequency-shift (FS) keying of tones $T_1$ through $T_{24}$. If the frequency increment for FS keying of all of tones $T_1$ through $T_{24}$ is to be 50 Hz, then the source 24 supplies phase step number increments of 50 × 2,097 for tones $T_1$ through $T_{24}$ to adder 22 in synchronism with the application of phase step numbers for tones $T_1$ through $T_{24}$ from adder 10. The output of source 24 is gated by a source 26 of FSK signals for each of tones $T_1$ through $T_{24}$ in accordance with the FSK modulation intended for the respective tones. The output at 28 of FSK adder 22 is a sequence of 24 phase step numbers for tones $T_1$ through $T_{24}$ during each cycle of 8000 Hz. Each phase step number is altered in accordance with a respective FSK modulating signal.

The output 28 of FSK adder 22 is applied to the input of a phase accumulator 30 which produces multiples of each received phase step number for FSK tones $T_1$ through $T_{24}$. The first sequence of 24 phase step numbers for tones $T_1$ through $T_{24}$ appears at the output 32 and are stored in twenty-four 24-bit shift registers (SR) 34 during one cycle of 8000 Hz. During the next cycle of 8000 Hz the 24 received phase step numbers are added to the stored phase step numbers to produce the second multiples thereof at the output 32 and in the shift registers 34. During the third cycle the input numbers are added to the sum in registers 34 to produce the third multiples. And so on, until multiples of each of the 24 phase step numbers overflow the 24-bit capacity of the accumulator (representing 360°) and the process repeats. The output of phase number accumulator 30 is thus 24 time division multiplexed sequences of step-increasing multiples of phase step numbers corresponding with 24 output tones. While there are 24 time slots for 24 output tones, it will be understood that some of the time slots may be unused when it is desired to produce fewer than 24 output tones.

Before the sequences of multiples of the 24 phase step numbers are applied to a sine wave lock-up table to read out digital samples of tones $T_1$ through $T_{24}$, the two most significant bits thereof may be altered in a phase shift keyer (PSK) 36 in accordance with signals from a source 38 of phase shift keying signals for each of the 24 tones $T_1$ through $T_{24}$. The phase shift signals for tones $T_1$ through $T_{24}$ occur in synchronism with the presence at 32 of multiples of the 24 phase step numbers for the tones $T_1$ through $T_{24}$. The source 38 of PSK signals changes the most significant bit of the binary number at 32 to produce a 180° phase shift of the corresponding output tone, and changes the next-to-most significant bit of the binary number to produce a 90° phase shift in the corresponding output tone.

The multiples at 40 of phase step numbers, as altered by frequency-shift and phase-shift modulating signals, for the 24 tones $T_1$ through $T_{24}$ are applied to a sine wave look-up table 42, which may be a read-only memory (ROM). For each multiple of a phase step number applied as an address to the ROM, there is read out a 9-bit number representing the amplitude and sign of a sine wave at the phase represented by the multiple of the phase step number. The amplitude for one multiple of a phase step number for each of the 24 tones $T_1$ through $T_{24}$ is read out during each cycle of the 8000 Hz. The ROM is thus operated at the 24 × 8 KHz or 912 KHz rate. The samples for each of tones $T_1$ through $T_{24}$ occur at the 8 KHz rate.

The sine wave samples at output 44 of the sine wave look-up table 42 are applied through an on-off keying switch (OOK) 46 controlled by a source 48 of on-off keying signals for all of the 24 output tones. The keying signals from source 48 for tones $T_1$ through $T_{24}$ occur in synchronism with the presence at 44 of samples occurring at the 8 KHz rate of the corresponding tones $T_1$ through $T_{24}$.

The output at 50 from the on-off keyer 46 includes 24 time division digital samples for the respective 24 tones $T_1$ through $T_{24}$ during each 125 μs period or cycle of the 8 KHz. The digital samples for tone $T_1$ occurring at the 8 KHz rate could be applied to a digital-to-analog converter to translate the digital samples to analog samples, and then passed through a low pass or smoothing filter to produce an output tone $T_1$ having a frequency determined by the phase step number for the first tone $T_1$ and having frequency-shift and/or phase-shift and/or on-off modulation. The same could be done for the digital samples corresponding with tones $T_2$ through $T_{24}$.

Instead of thus separating the time division multiplexed samples for tones $T_1$ through $T_{24}$, the 9-bit samples for all of tones $T_1$ through $T_{24}$ during one cycle of the 8 KHz are added together in a sample adder 52 to provide a 14-bit composite sample at 54 during each cycle of the 8 KHz rate. The sample adder 52 operates at the 24 × 8 KHz rate and resets to zero after 24 additions around the feedback path 56. The composite samples at 54 occur at the 8 KHz rate and represent the linear summation in digital form of the amplitudes of the 24 tones. The composite digital samples at 54 may constitute the useful output of the frequency synthesizer.

If it is desired to provide a composite analog output signal, the composite digital samples are applied to a digital-to-analog converter 58 operating at the 8 KHz rate to translate the composite digital samples to composite analog samples which contain components at 60 of all 24 of the variously-modulated tones $T_1$ through $T_{24}$. The composite analog samples may be passed through a smoothing filter (not shown) to produce a smooth composite analog wave containing components of all of the tones $T_1$ through $T_{24}$ each of which is frequency shift keyed, and/or phase shift keyed, and/or on-off keyed by individual modulating signals.

The composite digital samples, the composite analog samples and the smoothed composite analog signals are all useful, for example, for the purpose of controlling a transmitter transmitting the 24 modulated tones to a distant receiver, and are also useful for the purpose of testing demodulators of types used at a distant receiver.

It will be understood that the invention was described in terms of a specific system example for purposes of clarity of explanation only. The 24 TDM frequency tones $T_1$ through $T_{24}$ may be replaced by any other desired number of frequency tones. The frequency "tones" and the 8 KHz sampling rate herein need not be at the audio frequencies described but may be at any other desired frequencies. Any desired amounts of separation between the frequency tones may be employed, and any desired amounts of the three types of modulation may be employed. The tones may be waves other than sine waves. The frequency synthesizer system is seen to be a very versatile tool for the generation of many output frequencies, each having any desired kind and amount of modulation.

What is claimed is:

1. A direct digital frequency synthesizer, comprising means for generating a plurality of time-division-multiplexed phase step numbers corresponding with a respective plurality of frequency tones,
means for altering said phase step numbers corresponding with said tones in accordance with respective modulation signals,
an accumulator for translating each of said altered phase step numbers to a series of accumulated phase step multiple numbers,
a periodic wave look-up table, and
means to apply each of said series of phase step multiple numbers to said periodic wave look-up table to derive time-division-multiplexed digital samples of the amplitudes of corresponding modulated frequency tones.

2. A frequency synthesizer according to claim 1 wherein said periodic wave is a sine wave.

3. A frequency synthesizer according to claim 2 and, in addition, an adder to add together digital samples corresponding with all of said frequency tones to form composite digital samples.

4. A frequency synthesizer according to claim 3 and, in addition, a digital-to-analog converter to convert said composite digital samples to a composite analog signal containing frequency components corresponding with all of said tones.

5. A direct digital frequency synthesizer, comprising
a source of a phase step number corresponding with a frequency tone,
adder means to change said phase step number in accordance with a frequency modulation signal,
an accumulator for translating said changed phase step number to a series of accumulated increasing phase step multiple numbers,
means to change at least one of the two most significant bits of said accumulated phase step multiple numbers in accordance with a phase modulation signal,
a periodic wave look-up table,
means to apply said changed phase step multiple numbers to said periodic wave look-up table to derive digital samples of a corresponding frequency-modulated and phase-modulated frequency tone.

6. A frequency synthesizer according to claim 5 and, in addition, a digital-to-analog converter to convert the output of said look-up table to an analog frequency-modulated and phase-modulated frequency tone.

7. A frequency synthesizer in accordance with claim 5 and, in addition, a keyer for keying "on" and "off" the digital samples from said look-up table, whereby the output of said keyer comprises samples of a frequency tone which is frequency modulated, phase modulated, and on-off modulated.

8. A frequency synthesizer in accordance with claim 7 and, in addition, a digital-to-analog converter to convert the output of said keyer to an analog frequency-modulated, and phase-modulated, and on-off keyed frequency tone.

* * * * *

UNITED STATES PATENT AND TRADEMARK OFFICE
CERTIFICATE OF CORRECTION

PATENT NO. : 4,134,072

DATED : January 9, 1979

INVENTOR(S) : Thomas Vincent Bolger

It is certified that error appears in the above-identified patent and that said Letters Patent is hereby corrected as shown below:

Column 1, after the Title, add the paragraph:

---The Government has rights in this invention pursuant to Contract No. MDA 904-76-C-0337 awarded by the Department of the Army.---

Column 1, line 64, "n" should be ---$\underline{n}$---.

Column 1, line 65, "n" should be ---$\underline{n}$---.

Column 3, line 15, "lock-up" should be ---look-up---.

Column 3, line 41, "912" should be ---192---.

Signed and Sealed this

Eighth Day of May 1979

[SEAL]

Attest:

RUTH C. MASON
Attesting Officer

DONALD W. BANNER
Commissioner of Patents and Trademarks